(12) United States Patent
Agarwal

(10) Patent No.: US 7,627,705 B2
(45) Date of Patent: Dec. 1, 2009

(54) METHOD AND APPARATUS FOR HANDLING INTERRUPTS IN EMBEDDED SYSTEMS

(75) Inventor: Munish Agarwal, Noida (IN)

(73) Assignee: STMicroelectronics PVT. Ltd., Greater Noida (IN)

( * ) Notice: Subject to any disclaimer, the term of this patent is extended or adjusted under 35 U.S.C. 154(b) by 215 days.

(21) Appl. No.: 11/647,524

(22) Filed: Dec. 27, 2006

(65) Prior Publication Data
US 2007/0198759 A1 Aug. 23, 2007

(30) Foreign Application Priority Data
Dec. 30, 2005 (IN) ......................... 3547/DEL/2005

(51) Int. Cl.
*G06F 13/24* (2006.01)
(52) U.S. Cl. ...................... 710/265; 710/260
(58) Field of Classification Search ......... 710/260–269, 710/48–50
See application file for complete search history.

(56) References Cited
U.S. PATENT DOCUMENTS

| | | | | |
|---|---|---|---|---|
| 5,606,703 A | * | 2/1997 | Brady et al. | 710/264 |
| 5,613,126 A | * | 3/1997 | Schmidt | 710/260 |
| 6,499,078 B1 | | 12/2002 | Beckert et al. | |
| 6,681,281 B1 | * | 1/2004 | Maleck | 710/261 |
| 6,823,467 B1 | * | 11/2004 | Cantrill | 713/600 |
| 7,062,766 B2 | * | 6/2006 | Ronkka et al. | 718/100 |
| 2003/0110336 A1 | * | 6/2003 | Park et al. | 710/260 |
| 2005/0102460 A1 | * | 5/2005 | Wahler | 710/269 |
| 2005/0283556 A1 | * | 12/2005 | Parekh | 710/260 |
| 2006/0253635 A1 | * | 11/2006 | Uhler | 710/269 |
| 2007/0143516 A1 | * | 6/2007 | Sato | 710/264 |
| 2007/0239917 A1 | * | 10/2007 | Orita et al. | 710/268 |

\* cited by examiner

*Primary Examiner*—Raymond N Phan
(74) *Attorney, Agent, or Firm*—Gardere Wynne Sewell LLP

(57) ABSTRACT

An Interrupt Processor is provided in an embedded system to handle interrupts generated in the system. The function of the interrupt processor is to handle interrupts and execute interrupt routines. It performs code execution for interrupts which require immediate response. The other interrupts received by the interrupt processor are arranged in a queue on the basis of their respective priorities. An interrupt signal is then sent to the main processor which processes all the signals in one go. This prevents multiple and frequent switching of the main processor and hence avoids the switching overhead. Since the main processor operates at low frequency, the system consumes less power as compared to conventional systems.

13 Claims, 2 Drawing Sheets

METHOD AND APPARATUS FOR HANDLING INTERRUPTS IN EMBEDDED SYSTEMS

PRIORITY CLAIM

This Application claims priority from Indian Patent Application No. 3547/Del/2005 filed as a provisional on Dec. 30, 2005 and filed as a complete application on Dec. 22, 2006.

BACKGROUND OF THE INVENTION

Field of the Invention

The present invention relates to a method of handling interrupts in embedded systems. More particularly, the present invention provides an advanced interrupt processor with efficient interrupt handling technique that reduces power consumption in an embedded system.

An "interrupt" is a signal sent by a process to a computer's Central Processing Unit (CPU)/processor, through hardware or software sources in order to signal the need of processor cycles or other hardware resources. The CPU responds to an interrupt signal by suspending its current operations, saving the status of its work, and transferring control to a process for handling the interrupt. Interrupt signals can come from a variety of sources. For example, every keystroke generates an interrupt signal. Interrupts can also be generated by other devices such as a printer, key board, disk drive, and the like. These are called hardware interrupts. Interrupts initiated by programs are called software interrupts. Interrupts can occur for many reasons, such as service requests from hardware, errors in processing, memory problems etc. They allow the CPU to deal with asynchronous events occurring in the operating system.

The processing required for responding to an interrupt is done by an interrupt handler. An interrupt handler is basically a set of instructions typically residing in the CPU at a known address. Whenever an interrupt occurs the CPU jumps to that address and begins executing instructions stored at that location. At the end of the interrupt handler is an instruction that tells the CPU to jump back to what it was doing before the interrupt; it does that by restoring its previously saved state. In case of interrupt requests from more than one source, the interrupt handler prioritizes the interrupts and saves them in a queue. This is done by invoking a hierarchy of permission levels, called "interrupt priorities".

Conventional software-based interrupt handlers suffer from many drawbacks. Speed and performance of these interrupt handlers does not match the requirements of operating systems that execute interrupts at very high speed and efficiency. Moreover, since different hardware platforms have different interrupts and dissimilar interrupt priorities, software based interrupt handlers are not efficient in handling prioritized sets of interrupts from many diverse hardware platforms.

To overcome the drawbacks of conventional software-based interrupt handlers, hardware-based interrupt handlers were introduced. This type of interrupt handler minimizes software overhead to improve performance. One such hardware based interrupt handler has been described in U.S. Pat. No. 6,499,078 B1 by Beckert et al., the disclosure of which is hereby incorporated by reference. It discloses an interrupt handler implemented in hardware and external to a processor to handle interrupts destined for the processor. The interrupt handler is an N-dimensional prioritized interrupt array constructed as a hardware register. This array receives interrupts from different sources. The interrupt handler also has an interrupt scanning state machine that scans the prioritized interrupt array following receipt of an interrupt to extract the priority level and handling process associated with the interrupt.

The functionality described by the above-mentioned patent has become an integral part of every processor at present. However, the operation of these present day processors involves high power consumption.

When a conventional processor switches from application execution to interrupt routine, it is required to halt its current program execution, save its current context or status, service the interrupt, restore the interrupted context or status and resume execution of the interrupted program. Since the number of instructions executed for performing all these functions is very large, the processor needs to run at very high frequency for fast response. Even when a particular application does not require high operating frequency, the processor is made to run at high frequency to support real time interrupt response and thus consumes more power. Moreover, since in the present day processors interrupt responses are made to work on the principle of responding as fast as possible based on their configured priorities; this introduces extra over head related to more switching. The switching overhead adversely impacts the performance of conventional processors each and every time any hardware interrupt occurs.

Thus there is a need for an interrupt processor which reduces power consumption in a system. There is also a need to provide an improved interrupt processor that reduces power consumption in an embedded system.

SUMMARY OF THE INVENTION

In order to overcome the drawbacks of the prior art and address the aforementioned needs, the present invention provides an advanced interrupt handling mechanism which improves the overall performance of an embedded system by reducing the switching of the main processor. This is done by making the interrupt responses work on the principle of responding only as fast as required by the real time events.

In an embodiment, a system and method of handling interrupts generated in a system is provided. A processor known as an Interrupt Processor is provided in the embedded system. The function of the interrupt processor is to handle interrupts and execute interrupt routines. It performs code execution for interrupts, which require immediate response. Other interrupts received by the interrupt processor are arranged in a queue on the basis of their respective priorities. An interrupt signal is then sent to the main processor which processes all the signals in one go. This prevents multiple and frequent switching of the main processor and hence avoids the switching overhead as seen in the systems of the prior art. Moreover, since the main processor operates at low frequency, the system disclosed by the present invention consumes less power as compared to conventional systems.

In an embodiment, an interrupt handling processor in an embedded system comprises: a timer block for keeping track of arrival time of interrupt signals; an instruction set for execution of code of time sensitive interrupts; a priority selection block for arranging interrupts in a queue as per their priorities; at least one storage device for storing vector addresses of interrupt service routines of interrupt; and at least one storage device for storing priorities of interrupt signals.

In an embodiment, an embedded system utilizing an interrupt handling processor for reducing power consumption comprises: a main processor for processing a plurality of instructions; and an interrupt handling processor operatively coupled to said main processor for handling a plurality of interrupt signals, said interrupt handling processor comprising: a timer block for keeping track of arrival time of interrupt signals; an instruction set for execution of code of time sensitive interrupts; a priority selection block for arranging interrupts in a queue as per their priorities; at least one storage device for storing vector addresses of interrupt service routines of interrupt; and at least one storage device for storing priorities of interrupt signals.

In yet another embodiment, a method for handling interrupts in an embedded system comprises: receiving interrupt signals generated in a system; executing code of time sensitive interrupts; storing other interrupts in a queue in order of decreasing priority of interrupts; sending signal to main processor when the most critical interrupt requires execution; and processing all interrupts in the queue in one go.

In another embodiment, a system comprises: a main processor; and an interrupt processor that is smaller in terms of size and frequency as compared to the main processor. The interrupt processor handles interrupts and executes interrupt routines for certain ones of the interrupts which require an immediate response, and queues all other interrupts according to priority by setting a defined time period within which the interrupt must be responded. The interrupt processor sends a signal to the main processor to collectively receive and handle the queued interrupts at a time set by a minimum one of the defined time periods for the queued interrupts.

In yet another embodiment, a method comprises: receiving interrupts; providing an interrupt handler separate from a main processor; handling interrupts and executing interrupt routines by the interrupt handler for certain ones of the interrupts which require an immediate response; queuing all other interrupts according to priority set by a defined time period within which the interrupt must be responded; and when a first of the defined time periods expires, sending a signal to the main processor to have the main processor handle all the queued interrupts.

BRIEF DESCRIPTION OF THE DRAWINGS

The present invention is described with the help of accompanying drawings where.

DETAILED DESCRIPTION OF THE INVENTION

Figure 1:
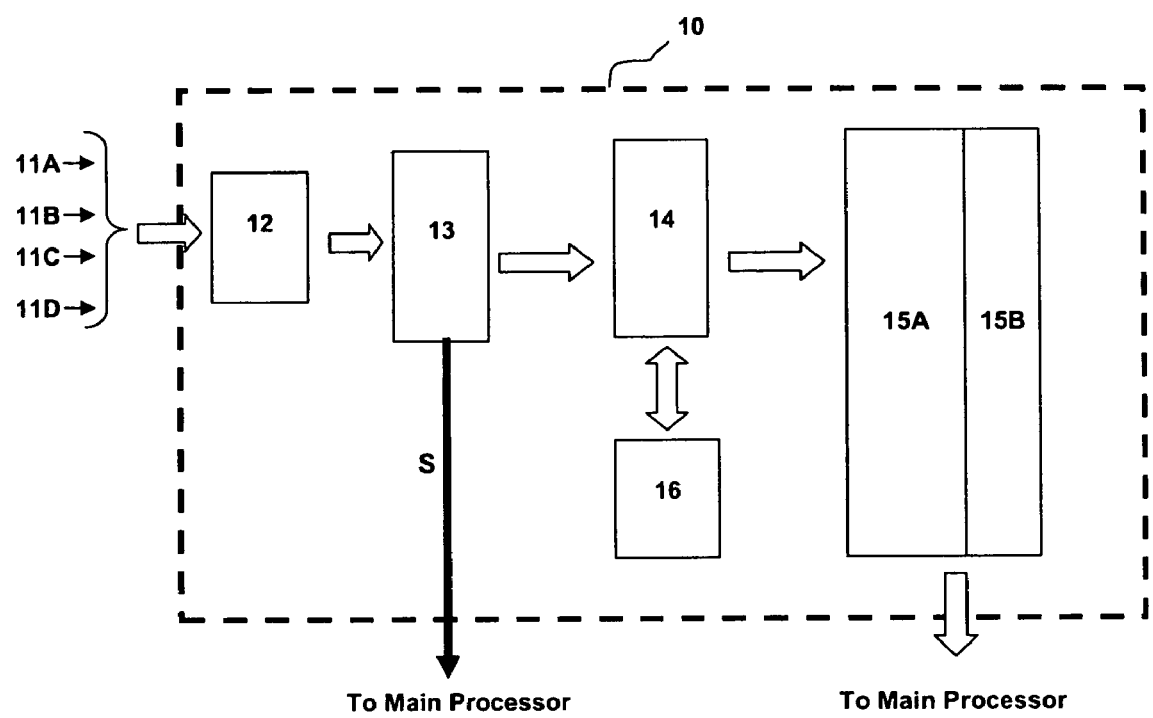
FIG. 1 illustrates a block diagram of an interrupt handling processor according to the present invention.

The preferred embodiments of the present invention will be described in detail with reference to the accompanying drawings. However, the present invention is not limited to the preferred embodiments. The present invention can be modified in various forms. The preferred embodiments of the present invention are only provided to explain more clearly the present invention to the ordinarily skilled in the art of the present invention. In the accompanying drawings, like reference numerals are used to indicate like components.

Interrupt routines in embedded systems are generally divided into parts. The first part of interrupt routine is called directly from the interrupt vector table. It comprises time critical interrupts, which need immediate response. If these interrupts are not executed immediately, further interrupts corresponding to same event can be lost. The other part of the interrupt routine comprises interrupts which are scheduled by a Real Time Operating system when a signal is sent from the first part of interrupt routine. These interrupts are scheduled at higher priority than application tasks but at much lower priority than other hardware interrupts.

An embodiment of the present invention provides a novel method of handling interrupts generated in a system. For this purpose, a processor known as an Interrupt Processor is provided. This processor is small in terms of size and frequency as compared to the main processor. The function of the interrupt processor is to handle interrupts and execute interrupt routines. It performs code execution for interrupts, which require immediate response. It queues the other interrupts according to their priorities and sends a signal to the main processor. The priority of an interrupt is decided by its "defined time". The "defined time" of an interrupt is the time period within which it must be responded. The interrupt processor does not send a signal to the main processor as soon as an interrupt is generated. It keeps all the signals in a queue. Based on minimum defined time, all the signals are sent to the main processor and the main processor executes all signals in one go.

FIG. 1 shows a block diagram of an Interrupt Processor as disclosed by an embodiment of the present invention. The Interrupt Processor (10) receives interrupt signals (11A, 11B, 11C, 11D . . . ) from various sources of interrupts in the system. The Interrupt Processor (10) executes the code of the interrupt signals, which are critical and require immediate response. This is done by execution of instructions in the instruction set (12). Since all the interrupts have almost same kind of code, the instruction set (12) is very small. Hence, the processor can be implemented using a Reduced Instruction Set Computer (RISC) processor. After the execution of instruction set (12), the interrupt signals are received by a timer/comparator block (13) as shown in FIG. 1. The function of this block is to keep track of elapsed time before the arrival of each interrupt signal. The interrupt signals are then sent to Priority Selection Block (14). This block executes queue management algorithm and stores the vector addresses of interrupt service routines of interrupt signals in a register according to their respective priorities. Block (15A) in FIG. 1 contains vector addresses of interrupt service routines corresponding to interrupt signals received by the Interrupt Processor (10). The priorities of received interrupt signals are stored in register (15B). The priority of a particular interrupt signal is decided by the Priority Selection Block (14) on the basis of number of factors. The most important of these factors is the "Defined Time" of an interrupt signal.

An interrupt signal generated in a system need not be responded to immediately. There exists a time period associated with each interrupt signal within which that signal must be responded. This time period is known as "Defined time". Defined times of all the interrupt signals determine their respective absolute priorities. The Priority selection Block (14) arranges all the interrupt signals according to their defined times in a queue. These signals are kept in a queue and a signal (S) is sent to the main processor depending upon the minimum defined time of an interrupt signal in the queue. The signal (S) to be sent to the main processor is generated by the timer/comparator block (13). In the meantime, if another interrupt signal is generated, the Priority Selection Block (14) does not place this signal at the end of the queue. Instead, it compares the defined time of all the signals, reshuffles the queue and places the interrupt signal accordingly in the queue.

As explained above, the signals are placed in a queue based on their absolute required response time. As a result, when these signals are executed by the main processor, the interrupt which is most critical is executed first. Also, by following this method, the Priority Selection Block (14) ensures that all the interrupt signals are responded to before their respective defined times elapse.

Apart from absolute priority of an interrupt signal, dynamic priority of an interrupt signal is also considered at the time of deciding its place in the queue. Dynamic priority of an interrupt signal depends on the time of generation of the interrupt by hardware of the system. Consider for example, two interrupt signals X and Y. The defined time for X signal is 10 msec and that for Y signal is 15 msec. If, for example, Y interrupt occurs first and X interrupt occurs 8 msec after the occurrence of Y interrupt. In this case, although the defined time for X interrupt is less than the defined time for Y interrupt, however since the remaining time, i.e. the time after which interrupt signal Y will be sent to the main processor (15 msec−8 msec=7 msec) is less than the defined time for X interrupt, the Priority Selection Block (14) places interrupt Y before the interrupt X in the queue.

Besides the aforementioned absolute and dynamic priorities, further priorities may be defined for some critical signals, which require immediate response. Priority Selection Block (14) uses this priority information before deciding the place of an interrupt signal in a queue. As a result, the most critical of the interrupts are placed first in the queue and responded to immediately.

Priorities of interrupt signals may also be defined in the form of weighted values. Less weighted value of an interrupt signal means that more priority is to be given to that particular interrupt. The weighted value of each interrupt signal is then multiplied with its calculated defined time. This is done by a Shift Block (16) as shown in FIG. 1. The weighted value of interrupt signals may be in the form of binary numbers. The resultant weighted value obtained by multiplying weighted value of an interrupt with its defined time determines the place of the interrupt signal in the queue. For example, consider the above mentioned case. The defined times for X and Y signals are 10 msec and 15 msec respectively. Now assuming that the weighted values of these signals are 10 and 20, the resultant weighted value for interrupt X is 10*10=100. The resultant weighted value for interrupt Y is 7*20=140 where 7 msec is the time after which interrupt signal Y will be sent to the main processor. Therefore, the resultant weighted value of X is less than that of Y; as a result, X has higher priority than Y. The interrupt signal X is hence placed above Y.

Figure 2:
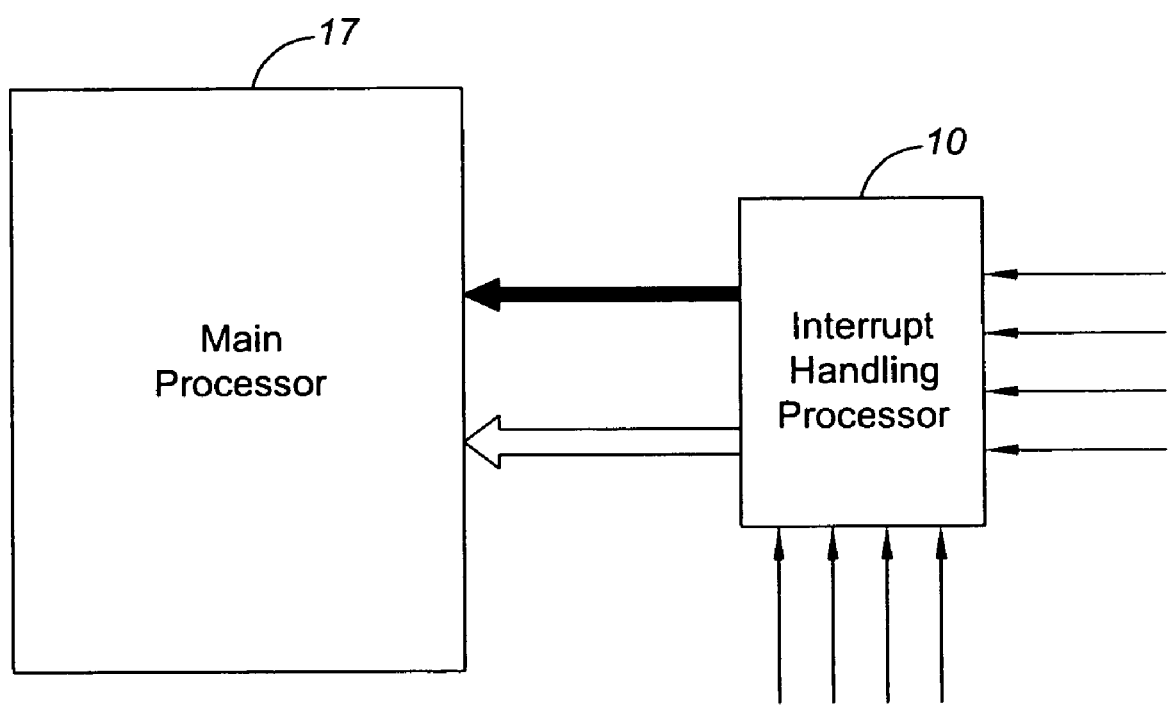
FIG. 2 illustrates a block diagram of an embedded system utilizing an interrupt handling processor according to the present invention.

FIG. 2 illustrates a block diagram of an embedded system utilizing an interrupt handling processor according to an embodiment of the present invention. The embedded system includes a main processor (17) and an interrupt handling processor (10). The interrupt handling processor (10) is coupled to the main processor (17). When a Priority Selection Block (14) arranges all the interrupt signals according to their defined times in a queue, the signal (S) is sent to the main processor depending upon the minimum defined time of an interrupt signal in the queue. The main processor (17) processes the interrupts at one go and avoids context switching. This reduces the power consumption of the embedded system.

In the present configuration, since more than one interrupt is processed by the main processor in one go, multiple and frequent switching of the main processor is avoided. The number of times the main processor switches from application execution to interrupt routine is greatly reduced. This results in a reduction of main processor operating frequency. As a result, the total operating frequency of the system in present invention, which is the sum of operating frequency of main processor and interrupt processor, is much lower than the frequency of main processor in case of conventional systems. As a result of low frequency of operation, the system disclosed consumes less power as compared to conventional systems.

Although the disclosure of circuit and method has been described in connection with the embodiment of the present invention illustrated in the accompanying drawings, it is not limited thereto. It will be apparent to those skilled in the art that various substitutions, modifications and changes may be made thereto without departing from the scope and spirit of the disclosure.

All documents cited in the description are incorporated herein by reference. The present invention is not to be limited in scope by the specific embodiments and examples which are intended as illustrations of a number of aspects of the invention and any embodiments which are functionally equivalent are within the scope of this invention. Those skilled in the art will know, or be able to ascertain using no more than routine experimentation, many equivalents to the specific embodiments of the invention described herein. These and all other equivalents are intended to be encompassed by the following claims.

What is claimed is:

1. An interrupt handling processor in an embedded system, comprising:
    a timer block for keeping a track of an arrival time of a plurality of interrupt signals;
    an instruction set for execution of code of time sensitive interrupts;
    a priority selection block for arranging the plurality of interrupt signals in a queue as per priorities of the plurality of interrupt signals;
    at least one storage device for storing vector addresses of interrupt service routines of the plurality of interrupt signals; and
    at least one storage device for storing priorities of the plurality of interrupt signals.

2. The interrupt processor as claimed in claim 1, wherein said storage device is any storage device such as memory register or the like.

3. The interrupt processor as claimed in claim 1 further comprising a shift block for calculating weighted values of interrupt signals.

4. An embedded system utilizing an interrupt handling processor for reducing power consumption, comprising:
    a main processor for processing a plurality of instructions; and
    an interrupt handling processor operatively coupled to said main processor for handling a plurality of interrupt signals, said interrupt handling processor comprising:
    a timer block for keeping a track of an arrival time of the plurality of interrupt signals;
    an instruction set for execution of code of time sensitive interrupts;
    a priority selection block for arranging the plurality of interrupt signals in a queue as per priorities of the plurality of interrupt signals;
    at least one storage device for storing vector addresses of interrupt service routines of the plurality of interrupt signals; and
    at least one storage device for storing priorities of the plurality of interrupt signals.

5. A method of handling interrupts in an embedded system comprising:
    receiving interrupt signals generated in a system;
    executing code of time sensitive interrupts;
    storing other interrupts in a queue in order of decreasing priority of interrupts;

sending a signal to a main processor when the most critical interrupt requires execution; and processing all interrupts in said queue one after the other.

6. The method as claimed in claim 5, wherein priority of an interrupt is determined by its absolute required response time.

7. The method as claimed in claim 5, wherein priority of an interrupt is dynamic and depends on time elapsed before the occurrence of an interrupt.

8. The method as claimed in claim 5, wherein priority of an interrupt is defined in terms of weighted value, more priority being given to interrupt with less weighted value.

9. The method as claimed in claim 8, wherein said weighted value is in the form of binary numbers.

10. A system, comprising:

a main processor;

an interrupt processor that is smaller in terms of size and frequency as compared to the main processor, wherein the interrupt processor handles interrupts and executes interrupt routines for certain ones of the interrupts which require an immediate response, and queues all other interrupts according to priority by setting a defined time period within which the interrupt must be responded, the interrupt processor sending a signal to the main processor to collectively receive and handle the queued interrupts at a time set by a minimum one of the defined time periods for the queued interrupts.

11. The system of claim 10 wherein the main processor responds to the signal from the interrupt processor by collectively handling the queued interrupts without context switching.

12. The system of claim 10 wherein the main processor responds to the signal from the interrupt processor by processing the collectively received and handled queued interrupts at one go.

13. A system, comprising:

a main processor;

an interrupt processor that is smaller in terms of size and frequency as compared to the main processor, wherein the interrupt processor handles interrupts and executes interrupt routines for certain ones of the interrupts which require an immediate response, and queues all other interrupts according to priority by setting a defined time period within which the interrupt must be responded, the interrupt processor sending a signal to the main processor at a time set by a minimum one of the defined time periods for the queued interrupts, and the main processor responding to said signal by collectively handling all the queued interrupts at one go.

* * * * *